Patented July 13, 1965

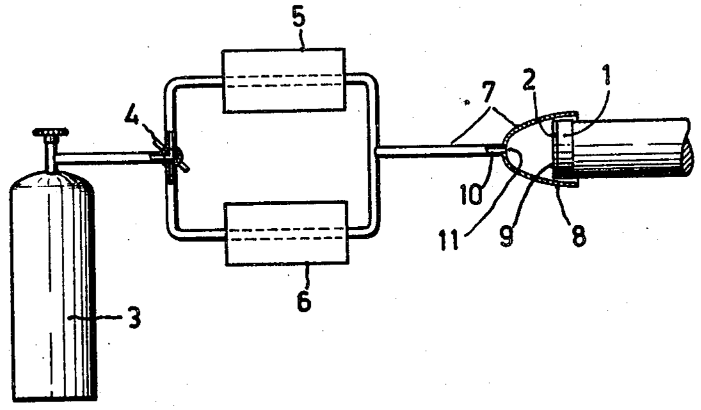
INVENTOR
HERMANN G. GRIMMEIS
RUDIGER MEMMING
HEIN KOELMANS
BY
Frank R. Trifari
AGENT United States Patent Office 3,194,700

3,194,700

GAS HEATING AND COOLING IN THE MANUFACTURE OF SEMICONDUCTOR DEVICES

Hermann Georg Grimmeiss, Aachen, and Rüdiger Memming, Neu Egenbuttel, near Hamburg, Germany, and Hein Koelmans, Eindhoven, Netherlands, assignors to North American Philips Company, Inc., New York, N.Y., a corporation of Delaware Filed July 13, 1962, Ser. No. 209,680
Claims priority, application Germany, July 14, 1961, N 20,331
10 Claims. (Cl. 148—186)

The invention relates to a method of manufacturing a semi-conductor device, for example a transistor, a diode or a photo-electric cell, comprising a semi-conductor body, in which in a part of the semi-conductor body adjacent the surface a change in the concentration variation of activators is obtained under the action of a thermal treatment.

Such methods are often employed in semi-conductor technique in order to act on a given part of the body, usually on a restricted surface part upon the phyiscal properties for example, the conductivity, the conductivity type, the lifetime of the charge carriers, the photo-sensitivity or the luminescence.

The variation in concentration may be carried out, as is known, so that the active impurity for example a donor, an acceptor, recombination centre or a radiation activator is introduced into the part of the body concerned by solid-state diffusion from the surroundings or is removed from the part of the body concerned by solid-state out-diffusion. A further known method consists in that a substance containing the active impurity is alloyed onto the part of the body concerned and, subsequently, upon cooling, during recrystallisation, the active impurity is deposited in the recrystallised part of the body. With such known methods the semi-conductor body is always heated in a furnace to the temperature, required for solid-state diffusion or for alloying.

For experiments leading to the invention it has been found that with the known methods the properties of the manufactured device are often adversely affected or even not obtained at all, since the whole body is subjected to the thermal treatment in the furnace. It is, for example, not possible to perform very rapid temperature variations in a furnace. It is therefore particularly difficult with a polycrystalline semi-conductor body and it is even practically impossible to obtain thin surface layers with abrupt variations in concentration of activator centers. With the known methods disturbing conversions may take place in the body to be treated, which could be avoided by applying rapid temperature variations. Moreover, since also the parts of the body not to be treated are heated to the same temperature, the properties of these parts may be adversely affected. For example, an unwanted shortening of lifetime may be involved in other parts.

On the basis of the consideration that a variation in concentration in part of a semi-conductor body does not require the whole body to be subjected to the same thermal treatment and that it suffices in the first place to cause the part concerned to pass through the desired temperature cycle, the invention provides a particularly simple, novel method of varying the concentrations in part of a semi-conductor body, while it is, in addition, possible to reduce materially the aforesaid disadvantages, at will, or even to obviate them.

To this end, in accordance with the invention, the part concerned of the body is subjected, in the method described, to at least part of the temperature cycle of the treatment by blowing a gas stream onto the surface of the part concerned to which stream previously a temperature corresponding to the part of the cycle concerned or such a temperature cycle is imparted, whereas otherwise the body is located in surroundings of a different temperature. Since the gas stream affects directly the part concerned of the body to be treated and the thermal capacities of the said part of the body are comparatively small, the part concerned of the body is capable of following rapidly the temperature variations applied thereto. By blowing a preheated gas stream onto the part of the body, the latter is rapidly heated, whereas, by blowing a precooled gas stream a rapid cooling can be ensured, which may sometimes be desired for freezing an activation state.

The temperature treatment may be carried out in a simple manner by blowing a gas stream heated to the desired temperature temporarily onto the surface concerned, and by removing it subsequently. The invention permits of carrying out effectively a method in which temperature programming of the gas stream is practised, so that the temperature of the gas stream is varied in accordance with the desired temperature cycle. In this respect a method in which the thermal treatment comprises the time-shifted blowing of a gas stream preheated to a temperature exceeding the ambient temperature and the blowing of a gas stream precooled to a temperature below the ambient temperature is particularly important. This permits, in particular, of cooling a part of the body rapidly from a high temperature to a low temperature. Such a temperature programming may be effectively obtained by conveying the gas stream by means of a multi-channel valve in order of succession through spaces having different temperatures.

The method according to the invention may be employed for obtaining a variation in concentrations throughout the surface of a semi-conductor body. Since it is possible to restrict the gas stream to a thin jet, the method according to the invention is particularly suitable for subjecting a restricted part of the surface to the treatment, by blowing the gas stream onto the part concerned. It is thus also possible, by moving the gas jet, to subject arbitrarily shaped surface parts to the treatment. Since otherwise the body is at a different ambient temperature, i.e. when heated, it is in surroundings of low temperature, the further parts of the body can be held at a low temperature, particularly when using rapid, transient temperature increases, at a lower temperature, so that it can be avoided that the physical properties of the further parts are adversely affected. To this end, part of the body surface not struck by the gas stream may be cooled at the same time, for example by contacting this part with a heat-withdrawing part or by blowing a cooled gas stream onto this part.

The gas stream, whch may be directed onto the surface concerned by means of a nozzle, comprises or consists preferably of an inert or a reducing gas, for example argon, nitrogen or hydrogen. If desired, oxidizing constituents, for example oxygen or water vapour may be added, if at the same time an oxidation of the surface is desired, for example in order to avoid evaporation. It has been found to be particularly efficaceous to use a nozzle having a funnel-shaped end for blowing the gas stream, since in this manner, particularly in the case of thin gas jets any additional cooling of the gas stream due to the expansion of the gas emanating from the nozzle and due to the suction of gaseous constituents of the surroundings can be reduced to a high extent. Although the invention also permits of evaporating or diffusing out an active impurity from a part of the body adjacent the surface, the said method has been found to be particularly efficient for providing variations in the concentration by introducing an impurity, particularly an active impurity. It is efficaceous to add the impurity to be introduced to the gas stream. In a further advantageous embodiment the impurity to be introduced is previously provided on the part concerned of the surface, after which it is introduced into the part concerned by blowing onto it a preheated gas stream. The introduction may be obtained by melting or alloying electrode material containing the active impurity. The method according to the invention is particularly suitable for carrying out the variation in concentration by diffusing (solid-state diffusion) an impurity, since the possibility of performing rapid, transient temperature increases and, if desired, of temperature programming permits of obtaining a variation deviating from the conventional concentration variation obtainable by diffusion in a furnace, for example a very steep concentration gradient.

The method has been found to be particularly suitable for use in the conversion of the conductivity type of a surface layer of a semi-conductor body and in this connection it is particularly important inter alia in the manufacture of radiation-sensitive devices, for example, pn-photodiodes and solar cells, in which the radiation strikes the layer concerned so that this layer must be particularly thin in order to obtain a high output. The method according to the invention permits of obtaining such a variation of the conductivity type with compounds such as a sulphide or a selenide, in which case this conversion can practically not be realized by the conventional thermal treatments. The invention permits, for example, of obtaining a p-type surface part (the p-conductivity of which might be due to impurity band conduction) in an n-type CdS body by applying an acceptor impurity, for example Cu, Ag or Ni, to the surface part concerned and by tempering it by a gas stream. In the same manner the introduction of a donor impurity, for example tin or germanium, and the subsequent heating by the gas stream could provide an n-type surface layer in a p-type GaSe body. With such a conversion of the part concerned by temperature programmation of the gas stream it is efficient to carry out first a rapid heating by a preheated gas stream and then to cool rapidly by a cooled gas stream. The semi-conductor body may be available in the form of a monocrystal. With respect to the known method, the method according to the invention is particularly advantageous when use is made of polycrystalline semi-conductor bodies. Since heating is carried out locally and a rapid temperature variation is obtained by heating and cooling, the irregularities in the diffusion involved in the treatment in a furnace and other disturbing conversions can be obviated to a high extent.

The invention will now be described more fully with reference to the drawing, which shows diagrammatically a device for carrying out the method according to the invention.

With reference to this figure the method according to the invention is explained for the manufacture of a pn-photodiode, in which an n-type CdS body is provided with a p-type layer on one side by carrying out a diffusion temperature treatment according to the invention.

To this end use was made of an n-type substantially monocrystalline CdS wafer 1, having a thickness of about 1 mm. and a longitudinal sectional area of about ¼ cm.$^2$, coated on one side with a copper layer 2 of $1\mu$ thickness by vaporisation, which body was treated in the manner illustrated in the figure in the tempering device shown in the figure.

This device comprised an inert gas, for example argon, available under excess pressure in a vessel 3. From this vessel 3 the inert gas could be conveyed with the aid of a three-way valve 4 along the space 5, kept at a temperature $T_1$, or along the space 6, kept at the temperature $T_2$, to the nozzle 7. The nozzle 7 has a cup-shaped end 8, so that the disturbing suction of air from the surroundings towards the surface 9 to be treated and a disturbing cooling of the gas stream emanating from the thin tubular part 10 were avoided. In this case the cup-shaped part 8 completely surrounded the surface 9 to be treated. The inner diameter of the tube 10 was about 3 mm. and the section of the cup-shaped end was, at the rim, about 1 cm.$^2$, while the distance of the outlet port 11 from the surface 9 was about 1.2 cm.

Since the diffusion of the Cu-layer 2 required a temperature program in which a rapid heating and, after some time, a rapid cooling is desired, the space 5 was formed by a resistance-heating furnace, kept at a high temperature of about 1000° C., whereas the space 6 was formed by a vessel filled with liquid air. In passing through the space concerned the gas stream adopted a different temperature in accordance with the rate of passage and by selecting the temperature of the space and by controlling the rate of passage any desired temperature of the gas stream could be obtained at the surface of the semi-conductor body. This temperature may be measured, for example by means of a thermal element arranged at the surface of the semi-conductor.

At the beginning of the treatment the body 1 was secured to a bar of high thermal conductivity, for example of iron, and introduced into the cup-shaped end 8, the coated surface facing the outlet port. The treatment was carried out simply in open air at room temperature, for example about 20° C.

By adjusting the three-way valve 4, the surface part 9 was worked for about 20 seconds by a gas stream of about 600° C., while the active acceptor impurity Cu was introduced into a thin surface layer of the body. By turning the three-way valve the surface concerned was subsequently cooled rapidly, for example for 15 seconds, by blowing on a gas stream passed through the liquid-air space 6.

After the Cu-layer had been removed and the surface treated and the opposite side of the body had been brought into contact with silver paste, it was found that a p-conductive layer had been obtained, the p-type conductivity of which might be ascribed to impurity band conduction. A radiation of clear sunlight striking this layer provided a short circuit current of about 10 ma./cm.$^2$ and a no-load voltage of about 0.6 v.

The photoresponse of the cadmiumsulphide cells, obtained by the method of the invention, appears to be superior to those in the prior art, which may be explained by the fact, that the inventive method enables a rapid and local temperature control, so that a diffusion pattern with a thin highly concentrated surface layer can be formed and this pattern can be frozen in the crystal lattice without giving the lattice the time for reaching the equilibrium state. Spectral sensitivity and temperature measurements indicate that an actual p-n junction is formed in using the process of the invention.

In the same manner a substantially polycrystalline wafer of p-conductive GaSe, subsequent to the application of a layer of about $1\mu$ in thickness of the donor impurity tin, was provided with an n-type diffused layer by using the thermal treatment according to the invention. The treatment was carried out in the same manner, with the only exception that the gas stream was heated at a temperature of 650° C., which temperature was maintained for 50 seconds, after which the gas stream passing through the space 6 was switched on for cooling. After the tin layer had been removed and after contacting, sunlight radiation provided a no-load voltage of 1.2 v. and a short-circuit current of about 0.5 ma./cm.$^2$.

In the same manner it is also possible to use, instead of copper with the embodiments described above, silver and nickel as acceptor impurities, and to use germanium for example instead of tin as a donor impurity.

It should finally be noted that the invention is, of course, not restricted to the aforesaid embodiments and that within the scope of the invention those skilled in the art may apply various modifications of the said method. The method may be employed, for example, not for the obtainment of a p-n junction but for doping a surface part with other active impurities, for example radiation centres. Instead of an inert gas stream, a reducing gas stream may be used, if desired, for example for removing oxide layers. Instead of in open air the treatment may be carried out in a protective atmosphere. Other desired temperature programs may, if desired, be applied, for example, by using a plurality of temperature spaces by means of a multi-channel valve or the temperature of a space through which the gas stream is passed may be varied in a desired manner for varying the temperature of the gas stream.

What is claimed is:

1. A method of making a semiconductor device comprising providing a semiconductive body in surroundings at an ambient temperature, providing a source of gas and heating means and cooling means for the gas, said heating means being maintained at an elevated temperature well above the ambient temperature and said cooling means being maintained beliw the ambient temperature, directing a stream of gas from the said source through the heating means and the resultant gas heated above the ambient temperature onto a restricted portion of the surface of the semiconductive body in the presence of an active impurity to diffuse without melting the active impurity into the heated restricted surface portion only of the body to alter an electrical property thereof, and immediately thereafter directing a stream of gas from the source through the cooling means and the resultant gas cooled below the ambient temperature onto the same said restricted surface portion of the body to rapidly cool same and thus preserve the altered electrical property.

2. A method as set forth in claim 1 wherein the heating and cooling means are jointly connected at one end to a valve connected to the gas source, and at the other end to a nozzle with a generally cup-shaped end, and the valve is first actuated to direct a stream of gas from the source through the heater means and then through the nozzle, and thereafter from the source through the cooling means and then through the said nozzle.

3. A method as set forth in claim 1 wherein the active impurity is added to the stream of heated gas before it is directed onto the semiconductive body.

4. A method as set forth in claim 1 wherein the device is a radiation-sensitive device, and a thin surface layer of the body at the restricted surface portion is converted to the opposite type conductivity.

5. A method as set forth in claim 1 wherein surface portions of the body not directly subjected to the stream of heated gas from the source are simultaneously cooled.

6. A method of making a semiconductor device comprising providing a semiconductive body in surroundings at an ambient temperature, providing an active impurity on a restricted surface portion of the body, providing a source of gas selected from the group consisting of an inert gas and a reducing gas and heating means and cooling means for the gas, said heating means being maintained at an elevated temperature well above the ambient temperature and said cooling means being maintained at a temperature well below the ambient temperature, directing a stream of gas from the said source through the heating means and the resultant gas heated above the ambient temperature onto the said restricted surface portion of the body to diffuse without melting the active impurity into the heated restricted surface portion only of the body to alter the conductivity type thereof, and immediately thereafter directing a stream of gas from the source through the cooling means and the resultant gas cooled well below the ambient temperature onto the same said restricted surface portion of the body to rapidly cool same and thus preserve the altered conductivity type.

7. A method as set forth in claim 6 wherein the semiconductive body is selected from the group consisting of a sulphide and a selenide.

8. A method as set forth in claim 7 wherein the semiconductive body is n-type CdS, and the impurity is selected from the group consisting of Cu, Ag and Ni.

9. A method as set forth in claim 7 wherein the semiconductive body is p-type GaSe, and the impurity is selected from the group consisting of Sn and Ge.

10. A method as set forth in claim 7 wherein the semiconductive body is polycrystalline.

References Cited by the Examiner

UNITED STATES PATENTS

| | | | |
|---|---|---|---|
| 2,816,847 | 12/57 | Shockley | 148—1.5 |
| 2,820,841 | 1/58 | Carlson | 148—186 |
| 2,849,341 | 8/58 | Jenny | 148—179 |
| 2,859,141 | 11/58 | Wolsky | 148—177 |
| 2,980,560 | 4/61 | Weiser | 148—1.5 |
| 3,114,663 | 12/63 | Klerer | 148—179 |

BENJAMIN HENKIN, *Primary Examiner.*

RAY K. WINDHAM, *Examiner.*